(12) United States Patent
MacNeille et al.

(10) Patent No.: US 10,520,951 B2
(45) Date of Patent: Dec. 31, 2019

(54) VEHICLE FORMATION MANAGEMENT

(71) Applicant: Ford Global Technologies, LLC, Dearborn, MI (US)

(72) Inventors: Perry Robinson MacNeille, Lathrup Village, MI (US); Bo Wu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 15/902,286

(22) Filed: Feb. 22, 2018

(65) Prior Publication Data
US 2019/0258268 A1    Aug. 22, 2019

(51) Int. Cl.
*G05D 1/02* (2006.01)
*H01Q 1/32* (2006.01)
*H04W 4/46* (2018.01)
*G08G 1/00* (2006.01)

(52) U.S. Cl.
CPC ........... *G05D 1/0287* (2013.01); *H01Q 1/325* (2013.01); *H04W 4/46* (2018.02); *G08G 1/22* (2013.01)

(58) Field of Classification Search
CPC ..... G05D 1/0287; G05D 1/0295; H04W 4/46; H01Q 1/325; G08G 1/091; G08G 1/22
See application file for complete search history.

(56) References Cited

U.S. PATENT DOCUMENTS

| | | | | |
|---|---|---|---|---|
| 7,404,074 | B2* | 7/2008 | Murotake | G06F 9/4401 713/1 |
| 8,352,111 | B2* | 1/2013 | Mudalige | G08G 1/22 340/435 |
| 9,141,112 | B1 | 9/2015 | Loo et al. | |
| 10,074,894 | B1* | 9/2018 | Birnbaum | H01Q 1/3266 |
| 10,171,967 | B2* | 1/2019 | Ameixieira | H04W 4/46 |
| 10,271,260 | B2* | 4/2019 | Koshy | H04W 40/06 |
| 2019/0044728 | A1* | 2/2019 | Karmoose | H04L 9/0643 |

FOREIGN PATENT DOCUMENTS

WO        2017079228 A2    5/2017

* cited by examiner

*Primary Examiner* — Michael J Zanelli
(74) *Attorney, Agent, or Firm* — Michael J. Spenner; Brooks Kushman P.C.

(57) ABSTRACT

Systems and methods for managing a formation of vehicles include at least one of the vehicles having a crossbar switch and a unidirectional antenna coupled to the crossbar switch. The vehicle is configured to form several networks, each including the vehicle and each other vehicle of the formation, using the crossbar switch and the antenna.

20 Claims, 7 Drawing Sheets

VEHICLE FORMATION MANAGEMENT

TECHNICAL FIELD

Aspects of this disclosure generally relate to managing vehicle formations.

BACKGROUND

Advancements in automotive technology have resulted in smarter vehicles able to make driving decisions without human intervention.

SUMMARY

In an exemplary embodiment, a system includes a first vehicle including a crossbar switch and a unidirectional antenna coupled to the crossbar switch. The first vehicle is configured to form a plurality of networks, each including the first vehicle and a second vehicle traveling in a formation with the first vehicle, using the crossbar switch and the antenna.

In a further exemplary embodiment, a system includes a plurality of vehicles traveling in a formation. Each vehicle includes a crossbar switch and a plurality of unidirectional antennas coupled to the crossbar switch. Each vehicle is configured to form a plurality of networks that each includes the vehicles using the crossbar switch and at least one of the antennas of the vehicle.

In another exemplary embodiment, a method includes forming, by a first vehicle, a plurality of networks via a crossbar switch of the first vehicle and a unidirectional antenna of the first vehicle that faces a second vehicle traveling in a formation with the first vehicle. Each of the networks includes the first vehicle and the second vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
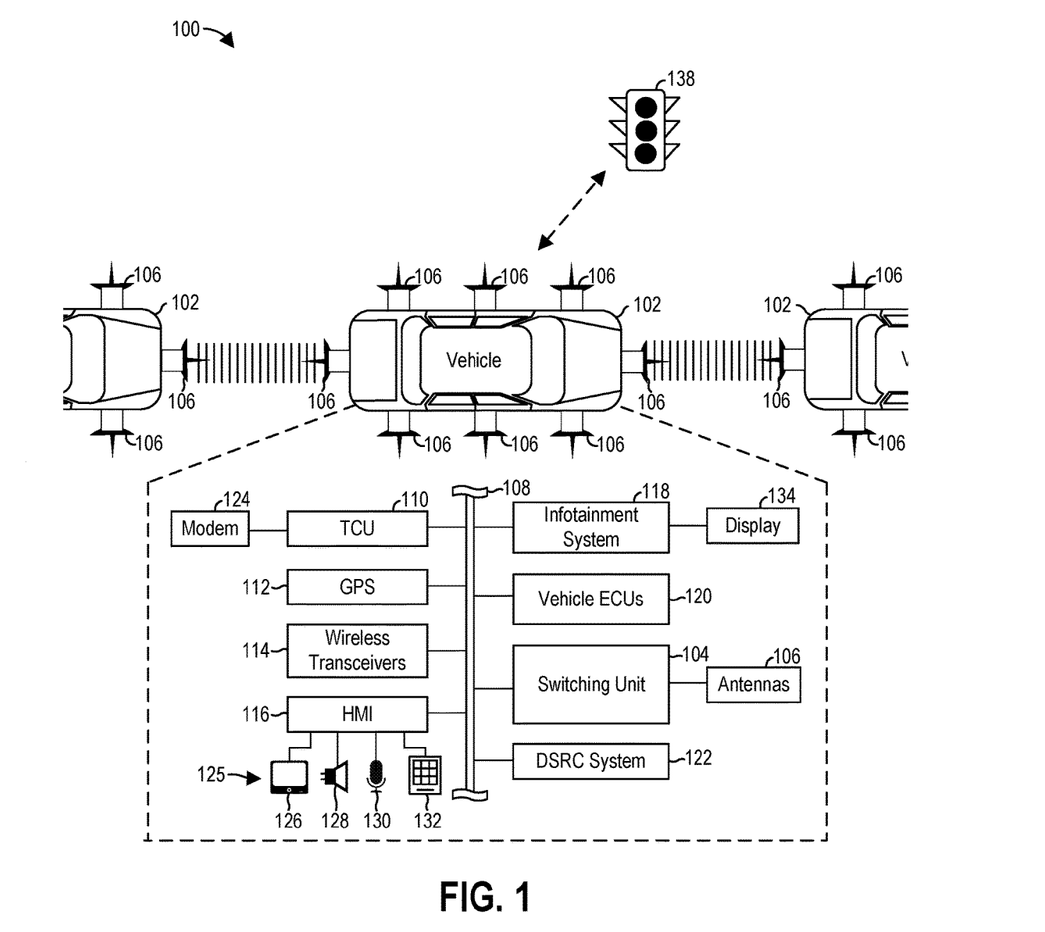
FIG. 1 is a schematic diagram of an exemplary system for managing vehicle formations.

FIG. 1 illustrates a system 100 for managing vehicle formations. The system 100 may include two or more vehicles 102 traveling together in a formation. In general, a formation may include two or more vehicles 102 arranged in a particular shape or pattern while traveling together, such as on a highway. As shown in the illustrated embodiment, the formation may be a platoon in which vehicles 102 travel in a nose-to-tail configuration. Other formations may include vehicles 102 traveling in side-by-side configurations, diamond configurations, and zig-zag configurations, as some non-limiting examples.

Each of the vehicles 102 of the formation may be autonomous or semi-autonomous such that minimal or no driver interaction is needed to operate the vehicle 102 from a starting location to a destination location. While traveling in the formation, the vehicles 102 may be configured to form multiple vehicle-to-vehicle networks that each includes all of the vehicles 102 of the formation and that are each specific to a different service for managing the formation. For example, one network may be specific to collective decision making, and another network may be specific to maintaining the formation. The networks formed by the vehicles 102 may reduce driving effort, increase safety, and improve fuel economy. Each of the networks of the formation may have different quality of service (QoS) metrics tailored to the service associated with the network, and the vehicles 102 may be configured to quickly adapt the networks to changes to the formation.

The vehicles 102 of the platoon may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. For example, different vehicles 102 may have different capabilities with respect to passenger capacity, towing ability and capacity, and storage volume. For title, inventory, and other purposes, the vehicle 102 may be associated with and include thereon a unique identifier, such as a Vehicle Identification Number ("VIN").

Each of the vehicles 102 of a formation may include several components, such as a switching unit 104, configured to facilitate the features and processes described herein. For example, the switching unit 104 of each vehicle 102 may be coupled to a plurality of unidirectional antennas 106 arranged around the vehicle 102, and may be configured to wirelessly connect and communicate with the antennas 106 of other adjacent traveling vehicles 102 of the formation. The switching units 104 of the vehicles 102 in the formation may be configured to form one or more networks including the vehicles 102 of the formation through these connections. Each network formed by the switching units 104 may enable specific applications and processes operating on each vehicle 102 to connect and share data, and may thus be optimized to support the connected applications and processes. For example, one network formed via the switching units 104 may be configured to support maintaining the formation. Another network formed via the switching units 104 may be configured to support collective decision making by the vehicles 102 of the formation, such as to decide on whether to pass the entire formation through an upcoming traffic signal or whether to split the formation and pass only some of the vehicles 102 through the traffic signal.

The switching unit 104 of each vehicle 102 may communicate with other vehicle 102 components via one or more in-vehicle networks 108. The in-vehicle networks 108 may include one or more of a vehicle controller area network ("CAN"), an Ethernet network, and a media oriented system transfer ("MOST") network. The other vehicle 102 components may include one or more of a telematics control unit ("TCU") 110, a global positioning system ("GPS") module 112, wireless transceivers 114, a human machine interface ("HMI") controller 116, an infotainment system 118, various vehicle electronic control units ("VCUs") 120, and a dedicated short range communications (DSRC) system 122.

The TCU 110 of the vehicle 102 may be configured to facilitate wireless communication between the vehicle 102 components and remote devices and systems over a network, such as the Internet or a telephone network. To this end, the TCU 110 may include an embedded cellular modem 124 or other wireless network transceiver (e.g., a Wi-Fi transceiver) configured to connect to the Internet or telephone network, and thereby facilitate communication between the vehicle 102 components and the remote devices and systems. The other vehicle 102 components may access the communication capabilities of the TCU 110, and thus communicate with remote devices and systems over a network, via the in-vehicle networks 108.

The GPS module 112 may be configured to identify vehicle 102 geographical data, such as by communicating with one or more satellites over a satellite link network. The vehicle 102 geographical data may include a current latitude and longitude of the vehicle 102. The GPS module 112 may be configured to provide the vehicle 102 geographical data to the other vehicle 102 components, and to remote devices and systems, automatically or on request. In addition or alternatively to being connected to the in-vehicle networks 108, the GPS module 112 may be part of or directly connected to the TCU 110, which may be configured to transmit the vehicle 102 geographical data to the other vehicle 102 components over the in-vehicle networks 108.

The wireless transceivers 114 may include one or more wireless transceivers that facilitate direct wireless communication between the vehicle 102 components and other devices and systems when such devices and systems are local to (e.g., within wireless communication range of) the wireless transceivers 114. For example, a wireless transceiver 114 of the vehicle 102 may be configured to directly connect and communicate with a corresponding wireless transceiver of a mobile device or key fob, and may thereby enable the vehicle 102 components to exchange data with the mobile device or key fob. This data exchange may enable the vehicle 102 to provide various features in cooperation with the mobile device or key fob such as hands-free telephone service, keyless entry and/or passive entry passive start ("PEPS"), playing music content from the mobile device, navigation, and in-vehicle applications reliant on content from the mobile device.

The wireless transceivers 114 may communicate via radio frequency ("RF") transmissions. As some non-limiting examples, the wireless transceivers 114 may include one or more of a Bluetooth transceiver, a Wi-Fi transceiver, a radio-frequency identification ("RFID") transceiver, and a near-field communication ("NFC") transceiver. The wireless transceivers 114 may include several wireless transceivers arranged around the vehicle 102 that are configured to support keyless entry and/or PEPS.

The HMI controller 116 may facilitate occupant interaction with the other vehicle 102 components. The HMI controller 116 may receive input from and output information to a vehicle 102 occupant via one or more HMI components 125 connected to the HMI controller 116. The HMI controller 116 may output information via video and alphanumeric displays 126, a speaker system 128, and any other suitable audio and visual indicators capable of providing data to the user. The HMI controller 116 may receive user input via a microphone 130 and via physical controls 132, which may include an alphanumeric keyboard, a pointing device, keypads, pushbuttons, and control knobs, capable of accepting commands or input from the user to invoke functions of the vehicle 102 components. For example, the physical controls 132 may include steering wheel audio buttons, a push-to-talk button, instrument panel controls, and the like. The HMI controller 116 may also receive user input from a touch screen mechanism of the display 126.

The functions of the HMI controller 116 may also be provided by one or more of the other vehicle 102 components. In other words, the HMI components 125 may be directly connected to one or more of the other vehicle 102 components to facilitate user interaction therewith (e.g., the display 134 connected to the infotainment system 118).

The infotainment system 118 may be configured to provide entertainment and information relating to the vehicle 102 to a user, such as via a graphical user interface ("GUI") shown on a display 136 connected to the infotainment system 118. For example, the infotainment system 118 may be configured to provide in-vehicle services such as navigation, radio, playing music from a connected mobile device, in-vehicle apps based on Internet content retrieved via a connected mobile device or the TCU 110, hands-free calling, and voice command recognition. In addition, the infotainment system 118 may enable users to view operational data relating to the vehicle 102 and to customize operation of the vehicle 102. Users may interact with one or more of these in-vehicle services via the display 136, which may be a touch screen display that enables users to submit commands and interact with the provided services. Alternatively, one or more of the physical controls 132 may be configured for interacting with the services provided by the infotainment system 118.

The vehicle ECUs 120 may be configured to monitor and manage various functions of the vehicle 102 under the power of the vehicle 102 battery and/or drivetrain. The vehicle ECUs 120 may include, but are not limited to, a powertrain controller configured to monitor and manage engine operating components; a body controller configured to monitor and manage various power control functions such as exterior lighting, interior lighting, keyless entry, remote start, and point of access status verification; a radio transceiver controller configured to communicate with key fobs, mobile devices, or other local vehicle 102 devices; and a climate management controller configured to monitor and manage heating and cooling system components (e.g., compressor clutch, blower fan, temperature sensors, etc.)

The DSRC system 122 may be configured to facilitate short to medium range RF communications between the vehicle 102 components and systems and devices external to the vehicle 102, such as travel infrastructure. For example, the DSRC system 122 may be configured to wirelessly communicate with an upcoming traffic signal 138 to receive timing data. The timing data may indicate a time until a next traffic signal 138 transition (e.g., changing to yellow or red in thirty seconds), which may then be provided to and displayed by the infotainment system 118 to inform vehicle 102 occupants and promote safe driving.

Figure 2:
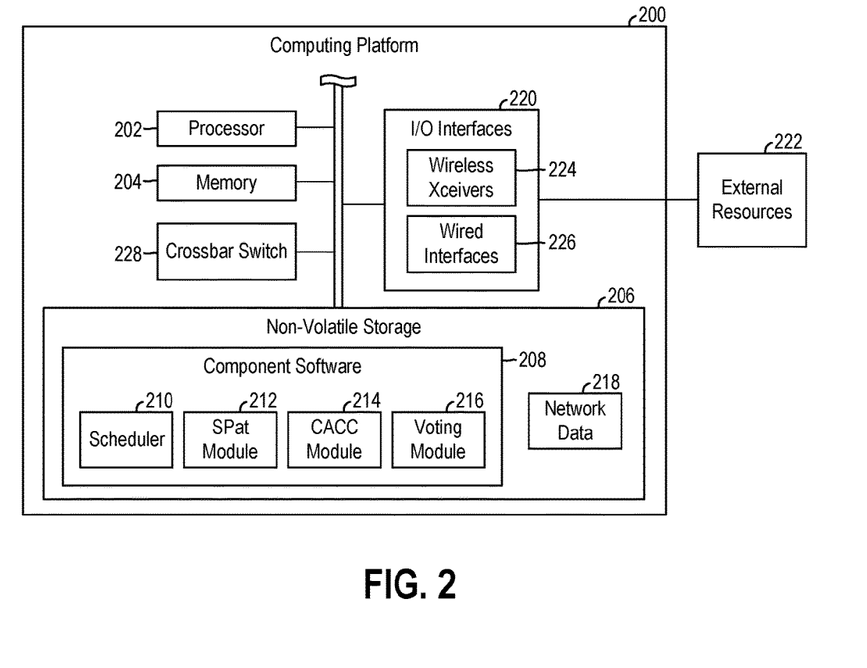
FIG. 2 is a schematic diagram of an exemplary computing platform that may be utilized in the exemplary system of FIG. 1.

Referring to FIG. 2, the vehicle 102 components and the traffic signal 138 may each be implemented by one or more computing platforms, such as the computing platform 200. A given computing platform 200 of the system 100 may include a processor 202, memory 204, and non-volatile storage 206. The processor 202 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions read into memory 204. The memory 204 may include a single memory device or a plurality of memory devices including, but not limited, random access memory ("RAM"), volatile memory, non-volatile memory, static random access memory ("SRAM"), dynamic random access memory ("DRAM"), flash memory, cache memory, or any other device capable of storing information. The non-volatile storage 206 may include one or more persistent data storage devices such as a hard drive, optical drive, tape drive, non-volatile solid state device, or any other device capable of persistently storing information.

The processor 202 may be configured to read into memory 204 and execute computer-executable instructions embodied as one or more software programs, such as the component software 208, residing in non-volatile storage 206. Upon execution by the processor 202, the component software 208 may be configured to cause the given computing platform 200 to implement the configured functions, features, and processes of the component (e.g., vehicle 102 components and/or system 100 components) including the computing platform 200. For example, a computing platform 200 of the infotainment system 118 may include component software 208 configured, upon execution of the processor 202, to provide in-vehicle services such as navigation, hands-free calling, and so on. The computer-executable instructions of the component software 208 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The component software 208 may include an operating system ("O/S") and/or one or more applications executable by the processor 202 of the computing platform 200. The O/S and/or one or more applications may be configured, upon execution by the processor 202, to cause the given computing platform 200 to implement one or more modules, such as one or more of a scheduler 210, a signal phase and timing ("SPaT") module 212, a cooperative adaptive cruise control ("CACC") module 214, and a voting module 216. Each of these modules may be represent one or more processes performed by the computing platform 200. The scheduler 210, which may be implemented by a computing platform 200 of the switching unit 104, may be configured to manage the formation and functioning of networks including the vehicles 102 of a formation. The SPaT module 212, which may be implemented by a computing platform 200 of the DSRC system 122, may be configured to receive and interpret data from travel infrastructure, such as timing data from a traffic signal 138. The CACC module 214, which may be implemented by a computing platform 200 of the switching unit 104 and/or of one of the vehicle ECUs 120 (e.g., the powertrain controller), may be configured to maintain the vehicles 102 in a given formation, and may be configured to implement changes to the formation, such as based on decisions of the voting module 216. The voting module 216, which may be implemented by a computing platform 200 of the switching unit 104 and/or one of the vehicle ECUs 120, may be configured to implement collective decision making by the vehicles 102 in the formation.

The non-volatile storage 206 may also include databases, such as the network data 218, utilized by the component software 208 to perform the functions described herein. For example, each network formed and managed by the scheduler 210 may have different needs in terms of physical resources, channel bandwidth, latency, and reliability, and may have different network topologies for connecting the processes on respective vehicles 102 of the formation, that depend on the service supported by the network. Such information may be included in the network data 218.

Figure 3:
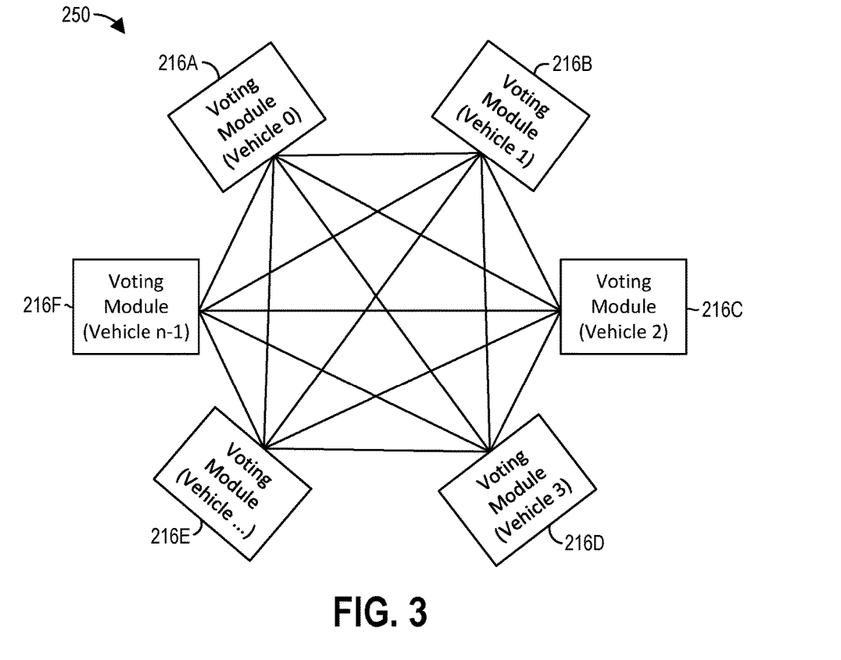
FIG. 3 is a topology for an exemplary collective decision making network that may be formed by the exemplary system of FIG. 1.
Figure 4:
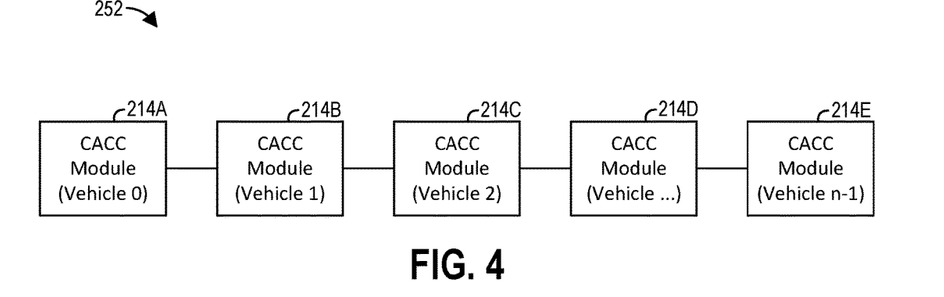
FIG. 4 is a topology for an exemplary formation maintenance network that may be formed by the exemplary system of FIG. 1.

For example, a network supporting collective decision making may be configured such that the voting module 216 of each vehicle 102 in the formation is able to share data with the voting module 216 of every other vehicle 102 in the formation, and may therefore be associated with network data 218 indicating a topology 250 as shown in FIG. 3. Each voting module 216A-F of the topology 250 may represent a voting process executing on a different vehicle 102 of the formation. As a further example, such as when the formation involves a platoon configuration, a network supporting a formation maintenance service may be configured such that the CACC module 214 of each vehicle 102 in the formation (besides the vehicle 102 leading the formation) is able to receive data from the CACC module 214 of the vehicle 102 immediately in front of the vehicle 102, and may therefore be associated with network data 218 indicating a topology 252 as shown in FIG. 4. Each CACC module 214A-E of the topology 252 may represent a formation maintenance process executing on a different vehicle 102 of the formation. Moreover, because maintaining the formation may be a constantly active process, the formation maintenance network may need to function faster, be more reliable, and/or have priority over other networks, such as the collective decision making network. Hence, the network data 218 may define networks formable by the switching units 104, such as by including one or more databases having network topologies, dedicated physical resources (e.g., various I/O ports for specific vehicle 102 components), and quality of service ("QoS") data for each network.

In some embodiments, corresponding processes of the vehicles 102 of a formation may communicate over a formed network via programming interfaces equivalent to the Message Passing Interface ("MPI") standard. Specifically, a process of the network may be configured to create an envelope containing shared data that includes four elements: the source (or "rank") identifying the sending process, a destination (or "rank") for each recipient processes, a tag describing the type of data (e.g., voting data, formation maintenance data), and a communicator element defining the communicator universe (e.g., each voting module 216 or CACC module 214 may be part of a same universe). In general, responsive to a process sending data via its programming interface into a given network formed by the vehicles 102, the network may be configured to buffer the data until the recipient(s) submit a request to receive the data. The receive request may similarly include the destination (or "rank") of the receiving process, a tag describing the type of data being requested, and the communicator element defining the communicator universe.

A given computing platform 200 may further include input/output ("I/O") interfaces 220 that provide one or more machine interfaces operatively coupling the processor 202 to external resources 222, such as the computing platform 200 of another vehicle 102 component or of another system 100 component, the modem 124, the display 134, the antennas 106, the in-vehicle networks 108, and/or the HMI components 125. The component software 208 of a given computing platform 200 may thus work cooperatively with the external resources 222 by communicating via the I/O interfaces 220 to provide the various features, functions, applications, processes, or modules described herein. The component software 208 may also have program code that is executed by the one or more external resources 222, or otherwise rely on functions or signals provided by the external resources 222.

The I/O interfaces 220 may include wireless transceivers 224 and wired interfaces 226. The wireless transceivers 224 may be the same as or similar to the wireless transceivers 114, and may thus include one or more of a Bluetooth transceiver, a Wi-Fi transceiver, a ZigBee transceiver, an RFID transceiver, and an NFC transceiver. The wireless transceivers 224 may also include a modem similar to or the same as the embedded modem 124 of the TCU 110, and may include a GPS module that is similar to or the same as the GPS module 112 of the vehicle 102. The wired interfaces 226 may include one or more of an Ethernet interface, a universal serial bus ("USB") interface, an auxiliary ("AUX") interface, and a bus interface for connecting to a CAN or MOST network.

For example, a given computing platform 200 of the infotainment system 118 may include an AUX interface for receiving audio form a mobile music device, a USB interface for connecting with and communicating with a mobile phone device, a Bluetooth transceiver for wirelessly connecting with a mobile phone device to provide services such as hands-free telephone service and in-vehicle apps based on content from the mobile phone device, and a Wi-Fi transceiver for sharing a vehicle's 102 Internet connection, which may be established via the modem 124 of the TCU 110 or via a Bluetooth connection to a mobile phone device, with other mobile devices within the vehicle (i.e., hot spot functionality).

A given computing platform 200 of the switching unit 104 may also include a crossbar switch 228, which may be configured to route data between external resources 222 and/or modules. The crossbar switch 228 may include a plurality of input buses and a plurality of output buses, such that each of the input busses are connectable to each of the output busses by a plurality of switching elements therebetween. In this way, data received on a given input bus may be routed to any of the output busses by manipulation of the switching elements.

Figure 5:
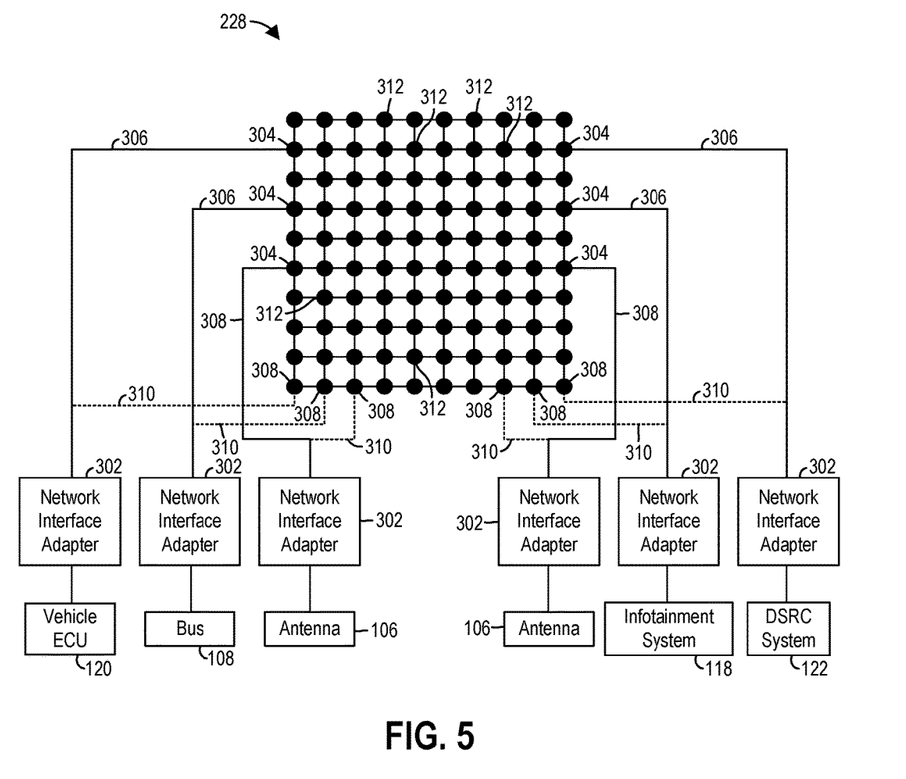
FIG. 5 is a schematic diagram of an exemplary network switch that may be utilized in the exemplary system of FIG. 1.

FIG. 5 provides an exemplary embodiment the crossbar switch 228 and of its connectivity to other components and devices of the vehicle 102. As shown in the illustrated embodiment, the crossbar switch 228 may be operatively coupled to a plurality of network adapters 302 via several buses so as to enable the crossbar switch 228 to receive input from each network adapter 302 and provide output to each network adapter 302. For example, the crossbar switch 228 may have several input interfaces 304 each connected to an input bus 306 (represented by a solid line), and may include several output interfaces 308 each connected to an output bus 310 (represented by a dotted line). Each network adapter 302 may be coupled to an input bus 306, an output bus 310, and a module or an external resource 222, such as the in-vehicle networks 108, a vehicle 102 component, or a unidirectional antenna 106.

The crossbar switch 228 may be configured to receive data from and route data to any modules and/or external resources 222 connected to the network adapters 302, thereby enabling the formation of multiple dynamic networks. In particular, the crossbar switch 228 may include a plurality of switching elements 312 that may be manipulated by the scheduler 210 to route data received via a particular input interface 304 to a particular output interface 308. For example, the scheduler 210 may be configured to cause the crossbar switch 228 to route data received from an input interface 314 coupled to a wireless antenna 106 to an output interface 308 coupled to another wireless antenna 106, thereby forming a network in which the vehicle 102 passes data received from one adjacent vehicle 102 to another adjacent vehicle 102.

The scheduler 210 may be configured to make routing decisions based on incoming data and the network data 218 defining the networks that may be formed by the crossbar switch 228. For example, the incoming data may indicate the intended recipients of the data, such as via including the rank of each recipient process as described above, may indicate the service for which the data is being transmitted, such a via including a tag described above, and/or may indicate which processes may be interested in the data, such as via including a communicator element as described above. The scheduler 210 may be configured to query the network data 218 for network parameters associated the indicators of the incoming data, and may be configured to route the data to the appropriate output interfaces 308 based on the network parameters. The scheduler 210 may also be configured to implement buffering and flow control based on the network data 218, such as based on the QoS data in the network data 218. For example, if multiple processes attempt to utilize a same input interface 304, a same output interface 308, or a same switching element 312 at the same time, the scheduler 210 may be configured to manage utilization of these physical resources such as by buffering data, rejecting data, and/or informing a module or an external resource 222 to retransmit at a later time based on the priorities of the different networks and services, which may be indicated by the QoS data for each network in the network data 218.

The crossbar switch 228 may include any one of several different switching topologies, and may include any N-dimensional K-ARY switch. The exemplary crossbar switch 228 of FIG. 5 has a square grid switching topology. However, one pair of opposite edges of the grid may be joined to convert the 2D grid into a cylinder switching topology. As a further example, both pairs of opposite sides may be joined to form a torus switching topology. Various switching topologies may be extended into higher dimensions and implemented for the crossbar switch 228, such as via a hypercube interconnect. All or part of the switching topology of the crossbar switch 228 may include tree networks, which may connect to form a star topology. Hybrids including two or more different topologies are also possible. The crossbar switch 228 may be implemented as a single integrated circuit, such as a field programmable gate array.

While an exemplary system 100 has been described above, the example is not intended to be limiting. Indeed, the system 100 may have more or fewer components, and alternative components and/or implementations may be used. For example, the functionality of two or more of the vehicle 102 components described above may be combined and implemented by a single component of the vehicle 102 that is connected to the in-vehicle networks 108. As a further example, a given module of the component software 208 described above may be implemented across several vehicle 102 components each separately connected to the in-vehicle networks 108.

Figure 6:
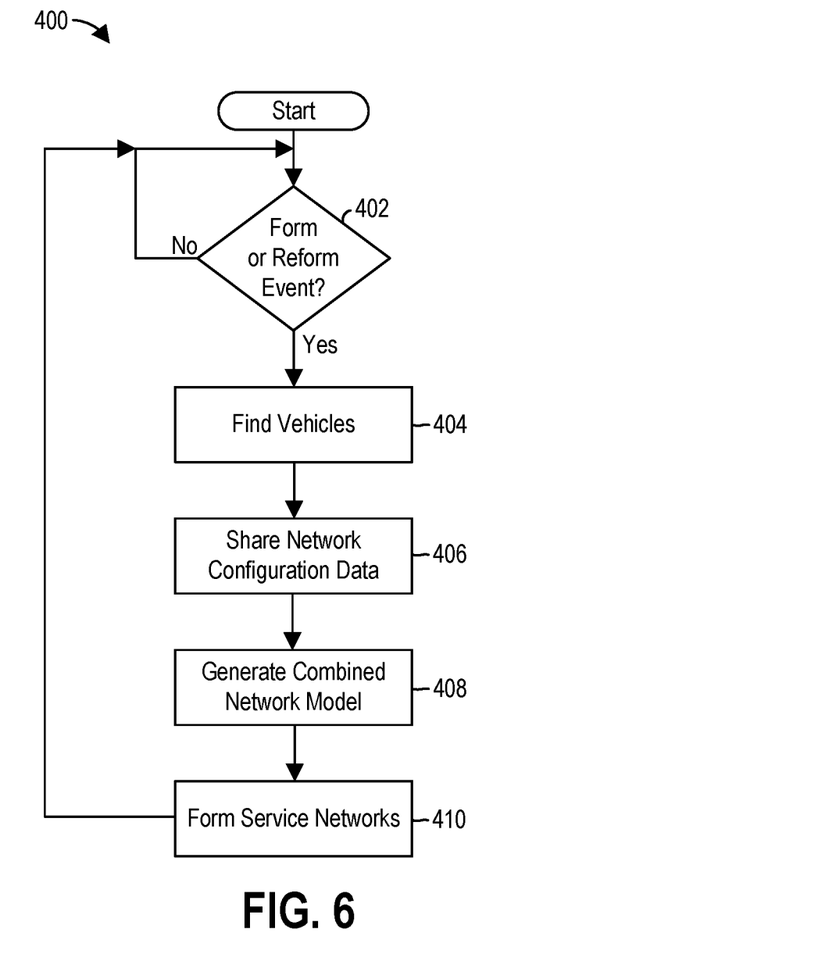
FIG. 6 is a flowchart of an exemplary process for forming vehicle-to-vehicle communication networks that may be performed by the exemplary system of FIG. 1.

FIG. 6 illustrates a process 400 that may be performed by the system 100 to form networks each including the vehicles 102 of the formation and to adapt to changes in the formation. In block 402, a determination may be made of whether a formation or reformation event has occurred. A formation event may occur when one or more vehicles 102 form a formation. For example, the scheduler 210 of each vehicle 102 may be configured to periodically and continuously send beacon signals out of each of the vehicle 102 antennas 106 for receipt by an antenna 106 of another vehicle 102. In response receiving a beacon signal via an antenna 106, the scheduler 210 may be configured to determine that a formation event has occurred. Alternatively, when several vehicles 102 are traveling together in a formation, the vehicle 102 occupants may be configured to manually indicate the formation event to the scheduler 210, such as via interaction with the HMI components 125.

A scheduler 210 may be configured to determine that a reformation event has occurred responsive to a network disturbance, such as when a connection with another vehicle 102 is unexpectedly broken because a vehicle 102 leaves the formation, or when a new connection with a new vehicle 102 is detected via an antenna 106 because a vehicle 102 enters the formation.

Responsive to identifying a network formation or reformation event ("Yes" branch of block 402), the vehicles 102 of the formation may be configured to automatically form or reconfigure one or more networks between the vehicles 102. Specifically, in block 404, the scheduler 210 of each vehicle 102 may be configured to find one or more other vehicles 102 in the formation, such as by searching for incoming signals at each antenna 106 of the vehicle 102. For example, if an incoming signal of a certain type and/or sufficient strength is detected at an antenna 106 on a right side of a vehicle 102, the scheduler 210 of that vehicle 102 may be configured to determine that another vehicle 102 is to the right of that vehicle 102. Adjacent vehicles 102 may also transmit an identifier, such as a VIN, to one another via their respective schedulers 210. For example, the identifier for a vehicle 102 may be included in the beacon or another signal sent from that vehicle 102 to another vehicle 102.

In block 406, each scheduler 210 may be configured to share network configuration data with the one or more other vehicles 102 identified by the scheduler 210. The network configuration data may include an identifier for the vehicle 102 from which the data is being shared and may include identifiers and positional information of the vehicles 102 detected adjacent to the sharing vehicle 102. Each scheduler 210 may further be configured to forward network configuration data received from a vehicle 102 via an antenna 106 to each other vehicle 102 found by the scheduler 210. In this way, the scheduler 210 of each vehicle 102 may receive the network configuration data of each other vehicle 102 in the formation.

Thereafter, in block 408, each scheduler 210 of the formation of vehicles 102 may be configured to combine the network configuration data of each vehicle 102 to generate a combined network model that includes each of the vehicles 102 of the model. For example, the combined network model may indicate the relative locations and capabilities of each vehicle 102 in the formation. In block 410, each scheduler 210 may be configured to participate in the forming of networks each dedicated to a particular service or process, such as based on network data 218 stored in the vehicle 102, as described above.

Figure 7:
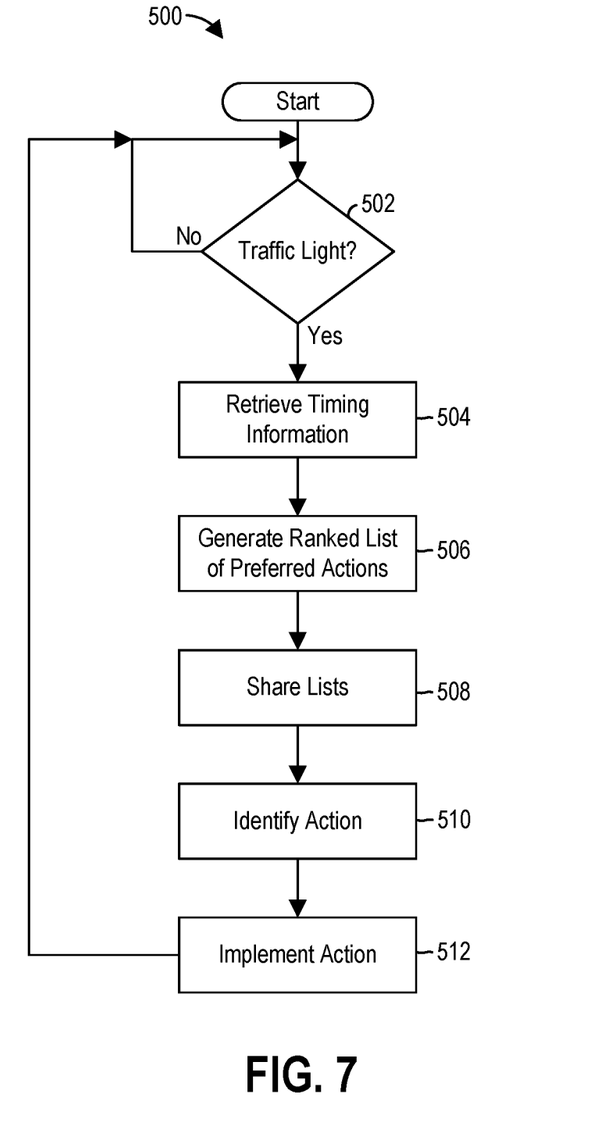
FIG. 7 is a flowchart of an exemplary process for collective decision making that may be performed by the exemplary system of FIG. 1.

FIG. 7 illustrates a process 500 that may be performed by the system 100 to implement collective decision making by the formation of vehicles 102, such as when the formation approaches a travel dilemma such as a traffic signal 138. When the formation of vehicles 102 approaches a traffic signal 138 controlled intersection, the formation generally has three options: stop before the intersection, continue through the intersection, or split the formation such that some of the vehicles 102 pass through the intersection and others do not. The process 500 may assist the formation at making this decision.

In block 502, the formation of vehicles 102 may determine whether it is approaching a traffic signal 138. The SPaT module 212 of each vehicle 102 may be configured to monitor for signals, such as DSRC signals, indicative of an upcoming traffic signal 138 while the formation is traveling. The SPaT module 212 each vehicle 102 may also be configured to determine whether a traffic signal 138 is upcoming based on geographical data from the GPS module 112 and Internet data, such as map data, received via the TCU 110 or a connected mobile device.

Responsive to identifying an upcoming traffic signal 138 ("Yes" branch of block 502), in block 504, each vehicle 102 in the formation may be configured to retrieve timing data from the traffic signal 138 that identifies a current status of the traffic signal 138 (e.g., red, yellow, green) and a time until transition to a next status, and possibly a time until a transition to a second next status (e.g., green to yellow, then yellow to red). The SPaT module 212 of each vehicle 102 may be configured to wirelessly connect and communicate with the traffic signal 138 to retrieve the timing data. Alternatively, only one vehicle 102, such as a vehicle 102 leading the formation, may be configured to retrieve the timing data via its SPaT module 212, which may then transmit the timing data to the SPaT modules 212 of the other vehicles 102 of the formation via a network formed by the scheduler 210 for this purpose (e.g., the collective decision making network).

In block 506, the formation of vehicles 102 may be configured to generate ranked lists of potential actions relative to the traffic signal 138. Specifically, based on the timing data and the formation of the vehicles 102, each voting module 216 of the vehicles 102 may be configured to create a ranked list of potential actions. The potential actions of each list may include stopping the entire formation before the traffic signal 138, passing the entire formation through the intersection, and splitting the formation at one or more places such that one or more vehicles 102 of the formation pass through the intersection and one or more vehicles 102 of the formation stop before the intersection. Each voting module 216 may be configured to rank each potential action with a value from the perspective of the voting module 216. The rankings may span from not possible to most preferred.

To rank the potential actions, the voting module 216 of a given vehicle 102 may be configured to determine, such as based on the timing data, the current speed of the given vehicle 102, the current acceleration of the given vehicle 102, and/or a current distance of the given vehicle 102 to the traffic signal 138, whether the given vehicle 102 is able to safely pass through the intersection with at least a given amount of time left until the traffic signal 138 changes to a yellow status or a red status. In other words, the voting module 216 of the given vehicle 102 may be configured to determine whether "t" is greater than or equal to a predefined time threshold, where "t" is the time until the traffic signal 138 changes to a yellow or red status when the rear bumper of the given vehicle 102 can earliest pass through the intersection. The value oft may be negative, meaning the rear bumper of the given vehicle 102 is not able to pass through the intersection before or concurrently with the traffic signal 138 changing status. Both "t" and the time threshold may be zero, which may represent the rear bumper of the vehicle 102 passing through the intersection concurrently with the traffic signal 138 changing status.

If "t" is not greater than or equal to the time threshold, then the voting module 216 of the given vehicle 102 may be configured to rank potential actions in which the given vehicle 102 passes through intersection as not possible. Alternatively, if the voting module 216 determines that "t" is greater than or equal to the time threshold, then the voting module 216 may be configured to positively rank potential actions in which the given vehicle 102 passes through the intersection.

The ranking of potential actions in which the given vehicle 102 passes through the intersection may be based on "t". Specifically, the voting module 216 may be configured to compare "t" with various predefined time bands, where each time band may be associated with a different potential action for the formation, and each subsequent time band may involve passing a greater number of vehicles 102 through the intersection. For example, assuming two vehicles 102 are following the given vehicle 102 in a platoon formation, a first compared time band may include greater than or equal to the time threshold and less than x seconds, and may be associated with a potential action of splitting the platoon immediately behind the given vehicle 102. A next compared time band may be associated with greater than or equal to x seconds and less than y seconds, and may be associated with a potential action of splitting the platoon between the two vehicles 102 immediately following the given vehicle 102. A further compared time band may be associated with greater than or equal to y seconds, and may be associated with a potential action of passing the entire platoon through the intersection. The above time bands are exemplary only, and additional or fewer predefined time bands may be compared by the voting module 216 if additional or fewer vehicles 102 are following the given vehicle 102, respectively.

The voting module 216 of the given vehicle 102 may be configured to rank potential actions in which more vehicles 102 pass through the intersection higher than potential actions in which fewer vehicles 102 pass through the intersection. Thus, the voting module 216 may be configured to rank the option associated with the time band including "t" as the highest ranked option, to rank potential actions associated with subsequent time bands as not possible, and to rank potential actions associated with preceding time bands as progressively lower. In other words, the more vehicles 102 that would pass through the intersection after the given vehicle 102 under a given potential action, the higher the ranking that may be assigned to that potential action.

Similarly, the voting module 216 of a given vehicle 102 may be configured to determine, such as based on the timing data, the current speed of the given vehicle 102, the current acceleration of the vehicle 102, and/or a current distance to the traffic signal 138, whether the given vehicle 102 is able to safely stop before the intersection with at least a given distance between the front bumper of the given vehicle 102 and the intersection. In other words, the voting module 216 of the given vehicle 102 may be configured to determine whether "d" is greater than or equal to a predefined distance threshold, where "d" is the distance between the intersection and the front bumper of the given vehicle 102 the earliest moment in which the vehicle 102 would be able to come to stop (e.g., after block 510). The value of "d" may be negative, meaning the vehicle 102 will not be able to safely come to a stop before entering the intersection. The distance threshold and "d" may be zero, which may represent the front bumper of the vehicle 102 stopping just before entering the intersection, such as at a designated stop line painted on a road at the intersection.

If "d" is less than the distance threshold, then the voting module 216 of the given vehicle 102 may be configured to rank potential actions in which the given vehicle 102 stops before the intersection as not possible. Alternatively, if the voting module 216 of the given vehicle 102 determines that "d" is greater than or equal to the distance threshold, then the voting module 216 may be configured to positively rank potential actions in which the given vehicle 102 stops before the front bumper of the given vehicle 102 enters the intersection.

The ranking of potential actions in which the given vehicle 102 stops before the intersection may be based on the value of "d". Specifically, the voting module 216 may be configured to compare "d" with various predefined distance bands, where each distance band may be associated with a different potential action for the formation, and where each subsequent distance band may involve stopping a greater number of vehicles 102 before the intersection. For example, assuming two vehicles 102 are traveling in front of the given vehicle 102 in a platoon formation, a first compared distance band may include greater than or equal to the distance threshold and less than x feet, and may be associated with a potential action of splitting the platoon immediately in front of the given vehicle 102. A next compared distance band may be associated with greater than or equal to x feet and less than y feet, and may be associated with a potential action of splitting the platoon between the two vehicles 102 immediately in front of the given vehicle 102. A further compared distance band may be associated with greater than or equal to y feet, and may be associated with a potential action of stopping the entire platoon before the intersection. The above distance bands are exemplary only, and additional or fewer distance bands may be compared by the voting module 216 if additional or fewer vehicles 102 are in front the given vehicle 102, respectively.

As before, the voting module 216 may be configured to rank potential actions in which more vehicles 102 pass through the intersection higher than potential actions in which fewer vehicles 102 pass through the intersection. Thus, the voting module 216 may be configured to rank the potential action associated with the distance band including "d" as a lowest ranked option, to rank potential actions associated with subsequent distance bands as not possible, and to rank potential actions associated with preceding distance bands as progressively higher. In other words, the fewer vehicles 102 that would be stopped before the intersection in front of the given vehicle 102 under a given potential action, the higher the ranking of that potential action.

In some embodiments, the voting module 216 of a given vehicle 102 may be configured to rank each potential action that is not the highest ranked option with a value that is "r"/"n" less than the next higher ranked potential action, where "r" is the highest available rank and "n" is the number of potential actions being positively ranked (e.g., not receiving a "not possible" designation). For example, assuming a given vehicle 102 is followed by two vehicles 102 and is following behind two vehicles 102 in a platoon formation, a determination is made by the voting module 216 of the given vehicle 102 that passing the entire platoon through the intersection and stopping the entire platoon before the intersection are not possible, and the highest possible ranking is ten, then "r" equals ten and "n" equals four. Accordingly, the voting module 216 of the given vehicle 102 may be configured to rank splitting the platoon between the last two vehicles 102 of the platoon as ten, may be configured to rank splitting the platoon immediately behind the given vehicle 102 as seven and a half, may be configured to rank splitting the platoon immediately in front of the given vehicle 102 as five, and may be configured to rank splitting the platoon between the first two vehicles 102 of the platoon as two and a half.

The ranked lists may also be based on one or more aggressiveness factors. The aggressiveness factors for each vehicle 102 may include preferences of the driver of the vehicle 102, which may be entered via the infotainment system 118, the HMI controller 116, and/or may be determined from driving characteristics (e.g., does the driver tend to speed up or slow down when approaching a traffic signal). The aggressiveness factors may further be based on a current destination of the vehicle 102 (e.g., is the vehicle 102 heading towards an appointment or towards a workplace, or is it heading towards a leisure activity). Each voting module 216 may be configured to take these factors into account when determining how aggressive to be relative to ranking the potential actions.

For example, if the aggressiveness factors indicate that a current driver desires aggressive driving, tends to speed up when approaching a traffic signal, or that the driver is on his or her way to work, then the voting module 216 may be configured to bias voting towards potential actions in which the vehicle 102 passes through the intersection. Alternatively, if the aggressiveness factors indicate that a current driver desires leisurely driving, tends to slow down when approaching a traffic signal, or that the driver is on his or her way to a leisure activity, then the voting module 216 may be configured to bias voting towards potential actions in which the vehicle 102 is stopped before the intersection. Such biasing may be performed by applying a multiplier to the respective potential actions, by adjusting the time threshold time up or down to respectively reduce or increase aggressiveness relative to passing through the intersection, by adjusting the distance threshold up or down to respectively reduce or increase aggressiveness relative to stopping before the intersection, and/or by considering the time threshold relative to transition to a yellow status or to a red status for reduced or increased aggressiveness, respectively.

In block 508, the vehicles 102 may be configured to share the ranked lists. Each voting module 216 may be configured to transmit its list of ranked potential actions to the pool of voting modules 216 of the other vehicles 102, such as via the collective decision making network established by the schedulers 210 of the vehicles 102. Hence, after the lists are shared, each voting module 216 of each vehicle 102 may be in possession of each list from the other voting modules 216 in the platoon.

In block 510, the vehicles 102 may be configured to identify a preferred action for the platoon of vehicles 102 based on the ranked list from each vehicle 102. Each voting module 216, responsive to receiving the ranked list of actions from the other voting modules 216 of the platoon, may be configured to identify the preferred action based on the ranked list of actions from the other voting modules 216 and the ranked list of actions of the given voting module 216. Each voting module 216 may be configured to determine the preferred action as the action having the highest combined ranking according to the ranked list of each of the voting modules 216, possibly with the additional rule that any potential action ranked as not possible by a voting module 216 is withdrawn from consideration. The voting modules 216 of the vehicles 102 may be configured to make this determination in parallel so as to reduce the latency that would be caused by one voting module 216 making this determination and sharing it with the other voting modules 216.

In block 512, the platoon of vehicles 102 may implement the identified preferred action. If the preferred action is for the entire platoon to travel through the intersection, then the CACC module 214 of each vehicle 102 may continue normal management of its vehicle 102 while the platoon travels through. If the preferred action is for the entire platoon to stop at the intersection, then the voting module 216 of the vehicle 102 leading the platoon may inform its CACC module 214, which may then cause the vehicle 102 to stop in its lane and at a designated stop line of the intersection by controlling the vehicle's 102 breaking, propulsion, and steering. The CACC modules 214 of the following vehicles 102 may then be configured to stop their vehicles 102 behind the lead vehicle 102 via implementation of the formation maintenance process described below. A given CACC module 214 may control the breaks, propulsion, and steering of a vehicle 102 by transmitting corresponding signals to the component software 208 of the vehicle ECU 120 responsive for managing such functions, such as the powertrain controller of the vehicle ECUs 120.

If the preferred action is to split the platoon such that one or more of the vehicles 102 pass through the intersection and one or more of the vehicles 102 stop at the intersection, the voting modules 216 of the vehicles 102 immediately on each side of the split may be configured to transmit a signal to its scheduler 210 indicating the splitting action. For example, if the split is to occur between a third and a fourth vehicle 102 in a platoon of traveling vehicles 102, then the voting module 216 of the third vehicle 102 and the voting module 216 of the fourth vehicle 102 may inform the scheduler 210 of the third and fourth vehicles 102, respectively. Thereafter, the scheduler 210 of each of the third and fourth vehicles 102 may be configured to disconnect the wireless connection with the other vehicle 102, such as by ceasing transmissions via the antennas 106 connecting the two vehicles 102. In addition, the voting module 216 of the fourth vehicle 102 may be configured to transmit a signal corresponding to the split to the CACC module 214 of the fourth vehicle 102, which may be responsively configured to control breaking, propulsion, and steering so as to cause the fourth vehicle 102 to stop at a designated stop line at the intersection. Thereafter, the CACC module 214 of the vehicles 102 following the fourth vehicle 102 may also proceed to stop, such as according to the formation maintenance process described below. Following the split, the schedulers 210 of the vehicles 102 that pass through the intersection, and the schedulers 210 of the vehicles 102 that stopped before the intersection, may each be configured to reconfigure the one or more networks with the vehicles 102 within their respective groups and without including those vehicles 102 that are not within their respective groups.

Figure 8:
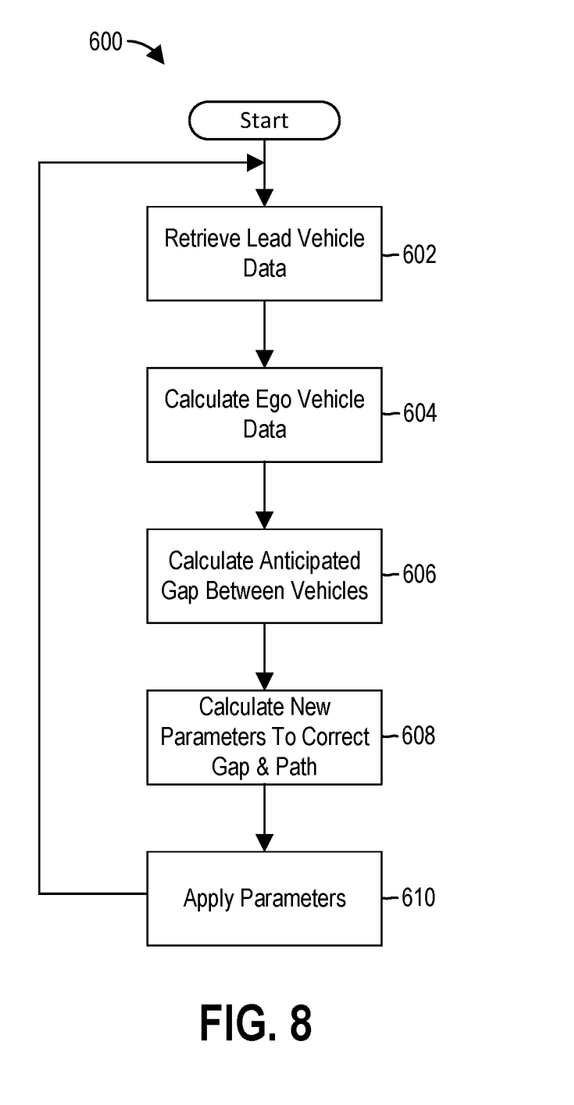
FIG. 8 is a flowchart of an exemplary process for maintaining a vehicle formation that may be performed by the exemplary system of FIG. 1.

FIG. 8 illustrates a process 600 for maintaining a formation over a formation maintenance network formed among the vehicles 102 of the formation. For example, the process 600 may be performed by the CACC module 214 of each vehicle 102 that is following another vehicle 102 to manage the gaps between the vehicles 102 and the path of each vehicle 102 in a platoon formation. In block 602, the CACC module 214 of a following vehicle 102 (hereinafter referred to as the "ego vehicle") may receive lead data from the vehicle 102 leading the formation over the formation maintenance network formed between the vehicles 102, or more particularly between the CACC modules 214 of the vehicles 102. Specifically, the CACC module 214 of the lead vehicle 102 may be configured to transmit the lead data at fixed time intervals, such as every tenth of a second, to the ego CACC module 214, either directly or through the CACC modules 214 of any in-between vehicles 102.

The transmitted lead data may include positional information for the leading vehicle 102, which may include a path line. The path line may be represented by one or more polynomial math curves, and may include a path history part indicative of the previous path of the leading vehicle 102, and a path prediction part indicative of an estimated position of the leading vehicle 102 after a fixed time interval. The lead data may further include a length of the leading vehicle 102. The ego CACC module 214 may be configured to compute an acceleration and steering angle of the leading vehicle 102 based on the received lead data.

In block 604, the CACC module 214 of the ego vehicle 102 may calculate ego data. Similar to the lead data, the ego data may identify an anticipated bearing and position of the ego vehicle 102 after the fixed time interval according to the ego vehicle's 102 current operating parameters. The ego data may also include an optimal path line of the ego vehicle 102. The optimal path line may similarly be represented by one or more polynomial math curves, and may represent the optimal bearing of the ego vehicle 102 after the fixed time interval in order to maintain the formation relative to the leading vehicle 102.

In block 606, the CACC module 214 of the ego vehicle 102 may calculate an anticipated gap between the ego vehicle 102 and vehicles 102 in front of and/or to the side of the ego vehicle 102 after the fixed time interval. This calculation may be based on the lead data and the ego data. In particular, the CACC module 214 of the ego vehicle 102 may be configured to compare the optimal path line with an anticipated bearing and position of these adjacent vehicles 102 after the fixed time interval, which may likewise be calculated based on the lead data and/or may be included in adjacent data received from the adjacent vehicles 102, to determine the anticipated gap between the ego vehicle 102 and the adjacent vehicles 102 after the fixed time interval.

In block 608, the CACC module 214 of the ego vehicle 102 may calculate new operational parameters for the ego vehicle 102 based on the optimal path line, the anticipated bearing and position of the ego vehicle 102, and the anticipated gaps. The operational parameters may include new breaking and/or propulsion torque values to correct the anticipated gap between the ego vehicle 102 and adjacent vehicles 102, and may include a new steering angle value to correct the anticipated path of the ego vehicle 102. In other words, the new operational parameters may cause the gap between the ego vehicle 102 and adjacent vehicles 102 to be closer to a predefined gap, and may cause the bearing and position of the ego vehicle 102 to be closer to the optimal path calculated for the ego vehicle 102, after the fixed time interval.

In block 610, the ego CACC module 214 may apply the new operational parameters, such as by transmitting corresponding signals to the component software 208 able to control the ego vehicle 102 engine and steering (e.g., the powertrain controller). Thereafter, the CACC module 214 of the ego vehicle 102 may repeat the process 300 to continue maintaining the proper gap and path of the ego vehicle 102. During the process 600, if the leading vehicle 102 comes to a stop, the CACC module 214 of a following vehicle 102 may cause the following vehicle 102 to come to a stop to maintain a predefined gap between the vehicles 102.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a first vehicle including a crossbar switch and a unidirectional antenna coupled to the crossbar switch, the first vehicle being configured to form a plurality of networks each including the first vehicle and a second vehicle traveling in a formation with the first vehicle using the crossbar switch and the antenna.

2. The system of claim 1, wherein each of the networks is configured for supporting a different service for the formation.

3. The system of claim 1, wherein a first one of the networks is configured to support collective decision making for resolving a travel dilemma of the formation, and a second one of the networks is configured to support maintaining the formation.

4. The system of claim 3, wherein the first network is configured to support collective decision making for passing the formation through an upcoming traffic signal.

5. The system of claim 3, wherein the second network is configured to support maintaining a predefined gap between the first vehicle and the second vehicle.

6. The system of claim 1, further comprising a database including quality of service data for each of the networks stored on the first vehicle, wherein the first vehicle is configured to form each network based on the quality of service data for the network included in the database.

7. The system of claim 6, wherein the second vehicle comprises a plurality of second vehicles, the database includes a network topology for the first vehicle and the second vehicles for each network, and the first vehicle is configured to form each network based on the network topology for the network included in the database.

8. The system of claim 1, wherein responsive to receiving timing data from an upcoming traffic signal, the first vehicle is configured to
transmit a first ranked list of potential actions for the formation generated based on the timing data to the second vehicle over one of the networks; and
responsive to receiving a second ranked list of potential actions for the formation from the second vehicle over the one network
identify a preferred action based on the first ranked list and the second ranked list, and
implement the preferred action.

9. The system of claim 8, wherein the potential actions for the formation include stopping the formation before an intersection of the upcoming traffic signal, passing the formation through the intersection, and splitting the formation such that the first vehicle passes through the intersection and the second vehicle stops before the intersection.

10. The system of claim 1, wherein responsive to a third vehicle entering the formation between the first and second vehicles, the first vehicle is configured to automatically reconfigure the networks to each include the first, second, and third vehicles.

11. A system comprising:
a plurality of vehicles traveling in a formation, each vehicle including a crossbar switch and a plurality of unidirectional antennas coupled to the crossbar switch and being configured to form a plurality of networks each including the vehicles using the crossbar switch and at least one of the antennas of the vehicle.

12. The system of claim 11, wherein a first one of the networks is configured to support collective decision making by the formation, and a second one of the networks is configured to support maintaining the formation.

13. The system of claim 11, wherein each vehicle includes a database having quality of service data for each network, and each vehicle is configured to form each network according to the quality of service data for the network in the database of the vehicle.

14. The system of claim 13, wherein the database of each vehicle further includes a network topology for the vehicles of the formation for each network, and each vehicle is configured to form each network based on the network topology for the network stored in the vehicle.

15. The system of claim 11, wherein responsive to receiving timing data from an upcoming traffic signal, each vehicle is configured to:
transmit a first ranked list of potential actions for the formation generated based on the timing data to each other vehicle of the formation over one of the networks; and
responsive to receiving a second ranked list of potential actions from each other vehicle of the formation over the one network
identify a preferred action based on the first ranked list and the second ranked list from each other vehicle of the formation, and
implement the preferred action.

16. A method comprising:
forming, by a first vehicle, a plurality of networks each including the first vehicle and a second vehicle traveling in a formation with the first vehicle via a crossbar switch of the first vehicle and a unidirectional antenna of the first vehicle facing the second vehicle.

17. The method of claim 16 further comprising:
supporting a collective decision making service for the formation via a first one of the networks; and
supporting a formation maintenance service via a second one of the networks.

18. The method of claim 16, wherein the second vehicle comprises a plurality of second vehicles, and further comprising forming each network based on a topology for the first vehicle and the second vehicles that is stored for the network in the first vehicle.

19. The method of claim 16 further comprising, by the first vehicle, responsive to receiving timing data from an upcoming traffic signal:
transmitting a first ranked list of potential actions for the formation generated based on the timing data to the second vehicle over one of the networks;
identifying a preferred action based on the first ranked list and a second ranked list of potential actions received from the second vehicle; and
implementing the preferred action.

20. The method of claim 16, further comprising, responsive to a third vehicle entering the formation between the first and second vehicles, reconfiguring the networks to each include the first, second, and third vehicles.

* * * * *